United States Patent
Mere et al.

(10) Patent No.: US 9,709,982 B2
(45) Date of Patent: Jul. 18, 2017

(54) FLIGHT MANAGEMENT SYSTEM OF AN AIRCRAFT

(71) Applicant: AIRBUS OPERATIONS (SAS), Toulouse (FR)

(72) Inventors: Jean-Claude Mere, Verfeil (FR); Pierre Neri, Tournefeuille (FR); Julien Bernat, Toulouse (FR); Marc Vie, Labarthe sur Leze (FR)

(73) Assignee: Airbus Operations (SAS), Toulouse (FR)

( * ) Notice: Subject to any disclaimer, the term of this patent is extended or adjusted under 35 U.S.C. 154(b) by 158 days.

(21) Appl. No.: 14/553,191

(22) Filed: Nov. 25, 2014

(65) Prior Publication Data

US 2015/0148998 A1    May 28, 2015

(30) Foreign Application Priority Data

Nov. 26, 2013 (FR) .................................. 13 61660
Apr. 14, 2014 (FR) .................................. 14 53296

(51) Int. Cl.
*H04L 29/00* (2006.01)
*G05D 1/00* (2006.01)
(Continued)

(52) U.S. Cl.
CPC .............. *G05D 1/00* (2013.01); *G01C 21/00* (2013.01); *G01C 23/00* (2013.01); *G05D 1/0202* (2013.01);
(Continued)

(58) Field of Classification Search
None
See application file for complete search history.

(56) References Cited

U.S. PATENT DOCUMENTS

| | | |
|---|---|---|
| 6,317,659 B1 | 11/2001 | Lindsley et al. |
| 7,436,350 B1 | 10/2008 | Maloratsky et al. |
| | (Continued) | |

FOREIGN PATENT DOCUMENTS

| | | |
|---|---|---|
| FR | 2914995 | 10/2008 |
| FR | 2922665 | 4/2009 |
| FR | 2 935 818 | 3/2010 |

OTHER PUBLICATIONS

U.S. Appl. No. 14/552,822 (Mere et al.) filed Nov. 24, 2014.
(Continued)

*Primary Examiner* — Thomas G Black
*Assistant Examiner* — Demetra Smith-Stewart
(74) *Attorney, Agent, or Firm* — Nixon & Vanderhye P.C.

(57) ABSTRACT

A flight management system with core and supplementary modules is proposed. The core module may include generic applications that implement generic functionalities related to a flight management of the aircraft. The supplementary module may include supplementary applications that implement supplementary functionalities specific to an entity to which the aircraft belongs. The supplementary module may be divided into principal and auxiliary partitions (or entities), and the supplementary applications, also referred to as principal applications, may be implemented in the principal partition. One or more auxiliary applications may be implemented in the auxiliary partition. Each auxiliary application may be associated with one or more principal applications such that the execution of the principal application requires the associated auxiliary application to be executed.

10 Claims, 2 Drawing Sheets

(51) Int. Cl.

| | | |
|---|---|---|
| *G08G 5/00* | (2006.01) | |
| *G01C 21/00* | (2006.01) | |
| *G01C 23/00* | (2006.01) | |
| *G05D 1/02* | (2006.01) | |
| *G08G 5/06* | (2006.01) | |
| *H04L 12/26* | (2006.01) | |
| *H04L 29/06* | (2006.01) | |
| *H04L 29/08* | (2006.01) | |
| *G06Q 10/08* | (2012.01) | |

(52) U.S. Cl.
CPC ........... *G06Q 10/087* (2013.01); *G08G 5/003* (2013.01); *G08G 5/0021* (2013.01); *G08G 5/0034* (2013.01); *G08G 5/0039* (2013.01); *G08G 5/06* (2013.01); *H04L 43/0823* (2013.01); *H04L 63/08* (2013.01); *H04L 67/12* (2013.01)

(56) References Cited

U.S. PATENT DOCUMENTS

| | | | | |
|---|---|---|---|---|
| 7,437,225 | B1* | 10/2008 | Rathinam | G08G 5/0013 340/961 |
| 8,903,569 | B2* | 12/2014 | Ruckes | B64C 19/00 244/10 |
| 9,250,630 | B2* | 2/2016 | Downey | G05D 1/0055 |
| 9,323,248 | B2 | 4/2016 | Mere et al. | |
| 2003/0093187 | A1 | 5/2003 | Walker | |
| 2004/0162648 | A1 | 8/2004 | Bontrager et al. | |
| 2005/0156777 | A1 | 7/2005 | King et al. | |
| 2007/0032921 | A1 | 2/2007 | Allen | |
| 2008/0154440 | A1 | 6/2008 | Carlton | |
| 2008/0163093 | A1* | 7/2008 | Lorido | G01C 23/00 715/771 |
| 2008/0215192 | A1 | 9/2008 | Hardman et al. | |
| 2008/0243319 | A1 | 10/2008 | Coulmeau et al. | |
| 2009/0132106 | A1 | 5/2009 | DeJonge | |
| 2009/0132107 | A1 | 5/2009 | DeJonge | |
| 2009/0138097 | A1* | 5/2009 | Rinaldi | H04L 12/24 700/17 |
| 2010/0125468 | A1 | 5/2010 | Avery et al. | |
| 2010/0145605 | A1 | 6/2010 | Valex et al. | |
| 2011/0131377 | A1 | 6/2011 | Gray et al. | |
| 2011/0137495 | A1 | 6/2011 | Sacle et al. | |
| 2011/0276199 | A1* | 11/2011 | Brot | G05D 1/0077 701/3 |
| 2012/0078450 | A1 | 3/2012 | Marche et al. | |
| 2012/0109424 | A1 | 5/2012 | Fervel et al. | |
| 2012/0191273 | A1* | 7/2012 | Jacobs | H04B 7/18508 701/3 |
| 2012/0265372 | A1 | 10/2012 | Hedrick | |
| 2012/0310450 | A1 | 12/2012 | Srivastav et al. | |
| 2013/0166111 | A1* | 6/2013 | Ruckes | B64C 19/00 701/3 |
| 2013/0274962 | A1 | 10/2013 | Cornell et al. | |
| 2014/0172204 | A1 | 6/2014 | Coulmeau et al. | |
| 2014/0183300 | A1 | 7/2014 | MacCulloch et al. | |
| 2014/0257598 | A1 | 9/2014 | Bailey et al. | |
| 2014/0309821 | A1* | 10/2014 | Poux | G08G 5/0021 701/14 |
| 2014/0343760 | A1 | 11/2014 | Le Gall et al. | |
| 2015/0148996 | A1 | 5/2015 | Mere et al. | |
| 2015/0148998 | A1* | 5/2015 | Mere | G05D 1/00 701/3 |
| 2015/0148999 | A1 | 5/2015 | Mere et al. | |
| 2015/0150095 | A1 | 5/2015 | Mere et al. | |

OTHER PUBLICATIONS

U.S. Appl. No. 14/553,274 (Mere et al.) filed Nov. 25, 2014.
Search Report for FR 1455559, completed Oct. 16, 2014, 8 pages.
Search Report for FR 1453296, dated Sep. 26, 2014, 2 pages.
Search Report for FR 1361660, dated Aug. 6, 2014, 2 pages.
U.S. Appl. No. 14/553,345 (Mere et al.) filed Nov. 25, 2014.
David Gascon, "Security in 802.15.4 and ZigBee Networks," Apr. 28, 2009, pp. 1-5, XP002728592, http://www.libelium.com/security-802-15-4-zigbee/.

\* cited by examiner

FLIGHT MANAGEMENT SYSTEM OF AN AIRCRAFT

PRIORITY

This application claims priority to Application No. FR1453296 filed Apr. 14, 2014, which is hereby incorporated by reference in its entirety. This application also claims priority to Application No. FR1361660 filed Nov. 26, 2013, which is hereby incorporated by reference in its entirety.

TECHNICAL FIELD

The technical area of the present disclosure relates to a flight management system of an aircraft.

BACKGROUND

Known architectures of avionic systems, notably of aircraft flight management systems, comprise two modules: a core module and a supplementary module. The core module is provided for implementing generic functionalities related to a management of a flight of an aircraft, and the supplementary module is provided for implementing supplementary functionalities specific to an entity to which the aircraft belongs.

Such architectures allow an operator (e.g., an equipment manufacturer) to develop the generic functionalities of the core module and another operator (e.g., an aircraft manufacturer or an airline company) to develop the supplementary functionalities of the supplementary module independently of each other. In this way, the developments of the flight management system can be simplified.

The update operations to the slight management system most frequently relate solely to certain supplementary functionalities that implement algorithms associated with the equations of the flight. During these update operations, the modifications carried out are most often minor in that they do not involve an in-depth modification of the supplementary functionality. That is, the modification does not change the behavior from the perspective of other generic or supplementary functionalities. Rather, the modification involves solely to a change or corrections of the code of the algorithm or algorithms that the supplementary functionality implements. For example, a supplementary functionality may be modified for a redefinition of the algorithm in order to make it more specific to the entity to which the aircraft belongs.

At present, even for such a minor modification of an algorithm, the operator must ensure the entirety of the modified supplementary functionality is compatible with the generic functionalities provided by the core module and with certain other supplementary functionalities with which the modified supplementary functionality has to interact. The result of this is that at present, any minor update of a supplementary functionality demands significant effort and time.

SUMMARY

An aspect of the present invention relates to an avionic system of an aircraft, such as a flight management system of an aircraft to address one or more short comings of conventional systems and methods to update the flight management system. A flight management system according to an aspect of the present invention may comprise a core module, a supplementary module, and a generic exchange between the core module and the supplementary module such that messages may be exchanged between the core and supplementary modules. The core module may comprise a plurality of generic applications. An execution of each of the generic applications may implement a generic functionality related to a management of a flight of the aircraft.

The supplementary module, which may be separate from the core module, may comprise a plurality of principal supplementary applications. An execution of each of the principal supplementary applications may implement a supplementary functionality specific to an entity to which the aircraft belongs. Examples of such entities include a specific aircraft model, a family of aircraft, a company, an alliance, and all or part of a fleet of aircraft.

The supplementary module may comprise two separate entities referred to as principal and auxiliary supplementary entities. The plurality of principal supplementary applications may be implemented in the principal supplementary entity. In the auxiliary supplementary entity, at least one auxiliary supplementary application may be implemented. Each auxiliary supplementary application may be associated with at least one principal supplementary application. For example, an association may be such that an execution of the principal supplementary application requires an execution of the associated auxiliary supplementary application. The supplementary module may furthermore comprise a specific exchange interface between the principal and the auxiliary supplementary entities. The specific exchange interface may be configured to enable messages to be exchanged between the principal and the auxiliary entities.

DESCRIPTION OF THE DRAWINGS

The features of the invention mentioned below, as well as others, will appear more clearly on reading the following description of examples of embodiment, the description being given with reference to the appended drawings, in which.

DETAILED DESCRIPTION

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium—transitory and/or non-transitory—and executed by a computer or processor, whether or not such computer or processor is explicitly shown.

The present description is given with reference to a flight management system (referred to as "FMS" in aeronautical language) of an aircraft, for example, an on-board flight management system. However, it will be understood that the principles described can be applied to any avionic system, for example an airport navigation system.

Figure 1:
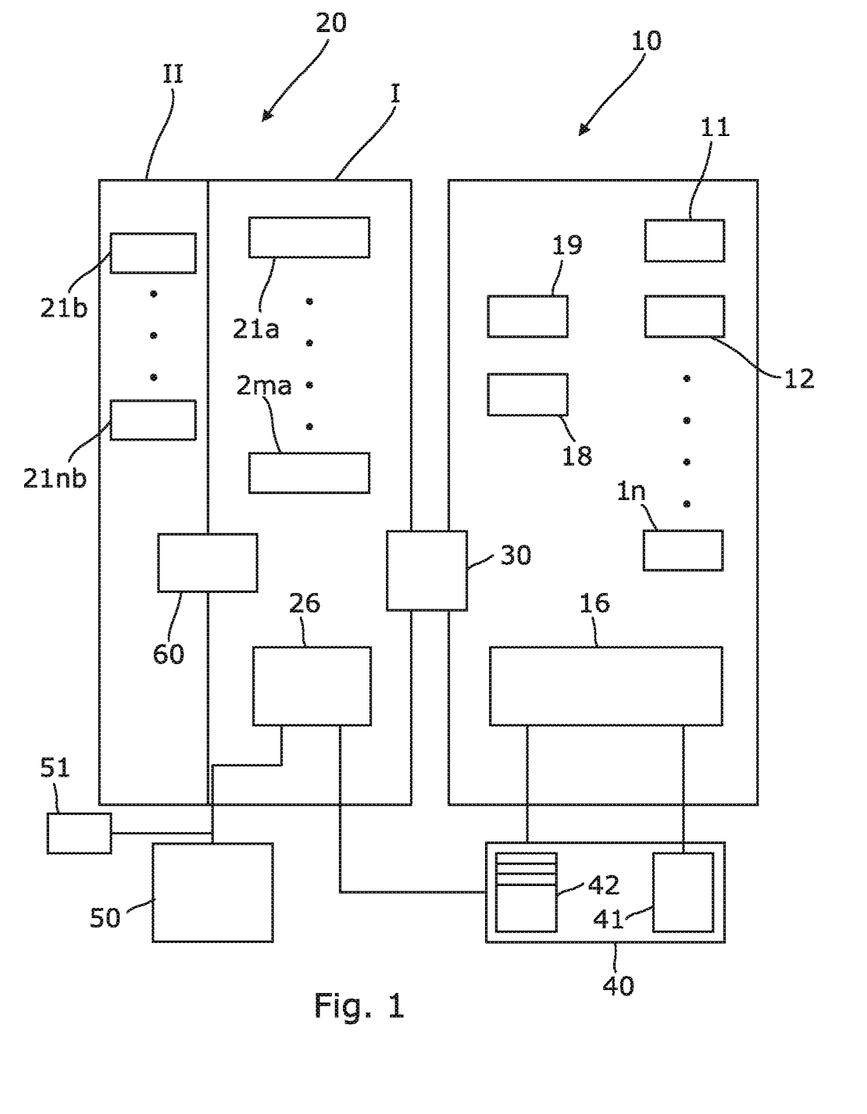
FIG. 1 is a block diagram of a flight management system of an aircraft according to an aspect of the present invention.

An example flight management system shown in FIG. 1 may include a core module 10 and a supplementary module 20. The core module 10 may comprise core elements configured to implement a plurality of core applications, also referred to as generic applications 11 . . . 1n. In one embodiment, each generic application 11 . . . 1n may be implemented through a corresponding core element. It may then be said that the core module 10 comprises a set of core elements 11 . . . 1n. The execution of each of the generic applications 11 . . . 1n of the plurality of generic applications may implement a generic/core functionality such as a functionality related to a management of a flight of an aircraft (e.g., flight plan management, fuel management, etc.). The generic functionalities may be either basic generic functions of the flight management system, or functional services that are also generic to the flight management system.

Below, the following standard specifications are mentioned: ARINC653 (Avionics Application Standard Software Interface), IMA (Integrated Modular Avionics (part of ARINC653), AFDX (Avionics Full Duplex Switched Ethernet), ARINC429 (Digital Information Transfer System), and ARINC661 (Cockpit Display System). The contents are incorporated by reference in their entirety.

In one embodiment, the generic applications 11 . . . 1n of the core module 10 may be implemented in at least one partition (in conformity with the ARINC653 standard) hosted on an IMA type of equipment. In this ARINC653 context, a partition includes software (e.g., set of code lines) which can be executed in a defined timeslot, segregated from execution time slots of other partitions (temporal segregation) so that activities in one partition do not affect timing of activities of another partition. The partitions can also be spatially segregated from each other (generally a memory space or input/output space) so as to prevent one partition from accessing a memory space of another partition.

The IMA equipment of the core module 10 may include an arithmetic unit, memory, physical interfaces with various devices of the aircraft or with other hardware equipments as well as an operating system configured to manage a set of partitions in such a way that the equipment in question can execute the generic applications in order to implement the core functionalities and/or services. It is thus seen that the core module can be implemented in hardware or in a combination of hardware and software. That is, the core module may be implemented in hardware or in a combination of hardware. Note that the core elements (corresponding to the core applications 11 . . . 1n) may be implemented in hardware or in a combination of hardware and software as well.

The generic functionalities implemented by the core module 10, e.g., through the execution of generic applications 11 . . . 1n, may include one or more of the following:

a flight plan management application configured to implement a flight plan management function, a trajectory calculation application configured to implement a function of calculating a trajectory in space, a prediction application configured to implement a function of calculating predictions of the values taken along a given trajectory of the aircraft by physical quantities relative to the flight conditions (speed, time, quantity of fuel, etc.), an extrapolation application configured to implement a function of extrapolation of values taken along a given trajectory of the aircraft by physical quantities related to the meteorological conditions (wind, temperature, etc.) based on a given model, a position calculation application configured to implement a function of calculating the current position of the aircraft, a deviation calculation application configured to implement a function of calculating deviations between the current position of the aircraft and a position of a given theoretical trajectory, a guidance application configured to implement a function of calculating guidance instructions for slaving the aircraft on a given trajectory, and one or more cockpit management applications configured to implement a set of functions making it possible to manage the cockpit of the aircraft according to a split type philosophy (through synchronization and control between several instances of the functions within the cockpit).

The supplementary module 20 may comprise principal supplementary elements configured to implement a plurality of principal supplementary applications 21a . . . 2ma. The words "principal" and "main" may be used synonymously in the context of referring to supplementary elements, applications and functionalities. For ease of reading, the phrase "principal supplementary" or "main supplementary" may be shortened simply to "principal" and "main" in such context.

In an aspect of the invention, the supplementary module 20 may also comprise auxiliary supplementary elements configured to implement a plurality of auxiliary supplementary applications 21b . . . 2kb. Again for ease of reading, the phrase "auxiliary supplementary" may be shortened to "auxiliary" in the context of referring to supplementary elements, applications and functionalities.

Each auxiliary application 21b . . . 2kb may be accessed by one or more principal applications 21a . . . 2ma according to a protocol that will be described in detail below. Each principal and/or auxiliary application may be specific to an entity to which the aircraft belongs, such as a specific aircraft model, a family of aircraft, a company, an alliance, all or part of a fleet of aircraft, and so on. In an embodiment, each principal application 21a . . . 2ma may be implemented through a corresponding principal element. Each auxiliary application 21b . . . 2kb may also be implemented through a corresponding auxiliary element. It may then be said that the supplementary module 20 comprises principal elements 21a . . . 2ma and/or auxiliary elements 21b . . . 2kb.

Each auxiliary application 21b . . . 2kb may include one or more algorithms executable on a computer, and the execution of that auxiliary application aims only to provide computing results to one or more principal applications 21a . . . 2ma. The execution of an auxiliary application may be made possible exclusively on reception of input parameters intended to feed the computing algorithms of that auxiliary application.

According to an aspect of the invention, certain principal applications 21a . . . 2ma may be associated with one or more auxiliary applications which they call upon in order to obtain data necessary for their execution. Such principal applications may be those whose execution involve calculations and/or particular numerical processing on data, the calculations and/or processing may be carried out by one or more auxiliary applications.

For example, a type of calculation carried out by an auxiliary application may be a calculation of prediction for a principal application whose execution implements a functionality to assist the crew in its navigation role. The auxiliary application may calculate the prediction by integrating equations of the dynamics of the flight with different initial conditions and/or by considering guidance modes that are different from one principal application to another. As another example, a particular processing on data may be a consolidation of data before its use in a generic application or in a principal application. The auxiliary application may consolidate the data according to an algorithm that is new or different from the one used in the core module 10 and/or used previously in the supplementary module 20.

The execution of each of the principal applications 21a . . . 2ma may implement a corresponding supplementary functionality of the supplementary module 20. Each supplementary functionality may be a functionality specific to an entity to which the aircraft belongs, such as a specific aircraft model, a family of aircraft, a company, an alliance, all or part of a fleet of aircraft. The supplementary functionalities may be new functions with respect to the core functions of the core module 10 (i.e., functions not provided through the core module 10), or alternative functions to the core functions of core module 10 to which they apply behavioral modifications, or provide supplementary services so as to supplement the services of the core module 10 which use one or more of these supplementary functionalities.

According to an aspect of the invention, the principal applications 21a . . . 2ma may be implemented in a first entity I and the auxiliary applications 21b . . . 2kb may be implemented in a second entity II. The first entity I may be referred to as the principal (or main) supplementary entity or simply as the principal (or main) entity. The second entity II may be may be referred to as the auxiliary supplementary entity or simply as the auxiliary entity. In this context, an entity may be viewed as a partition or a logic component of a partition. A logic component may include a set of coherent codes from a functional/software point of view. The code may be stored in a memory of the partition. One logic component may be able to share common resources with one or more other components of the same partition. A partition can host several components. This means that the principal and/or the auxiliary entity may each host one or more logic components.

Preferably, the principal applications 21a . . . 2ma and the auxiliary applications 21b . . . 2kb of the supplementary module 20 are implemented in the principal and auxiliary partitions I, II (in conformity with ARINC653) hosted on a same IMA equipment. As mentioned, the IMA equipment may comprise an arithmetic unit, memory, physical interfaces with various devices of the aircraft and/or with other hardware equipments as well as an operating system configured to manage the two partitions I, II in such a way that the IMA equipment is capable of executing the principal applications and the auxiliary applications associated with principal applications in order to implement the supplementary functionalities of the supplementary module 20. It is thus seen that the principal and/or the auxiliary partition can be implemented in hardware or in a combination of hardware and software. Note that the principal elements (corresponding to the principal applications 21a . . . 2ma) and/or the auxiliary elements (corresponding to the auxiliary applications 21b . . . 2kb) may be implemented in hardware or in a combination of hardware and software.

Preferably, the principal and auxiliary partitions I and II are separate from each other and also separate from the core partition implementing the generic functionalities 11 . . . 1n. The segregation between the principal and auxiliary partitions I, II of the supplementary module 20 and the partition of the core module 10 may be ensured by low level logic layers (which may be implemented through software). For example, an operating system may use hardware clocks inside the microprocessor running the partition to provide the temporal segregation. To provide the spatial segregation, the operating system may use control mechanisms for controlling access to the physical space (memory or the input/output) in question.

In the context of the ARINC653 standard, each partition (core, principal I, auxiliary II) may be associated with at least one memory sharing communication port, called a RAM port, or with at least one file exchange memory area, allowing that partition to exchange messages with the other partitions. This exchange of messages, also referred to as interpartition communication, can be carried out by sampling (Sampling port: the memory associated with the port is updated each time an item of data is received) or by queuing (Queuing port: the messages are received in a queue). These messages which can be sent and/or received by a port may include one or more of the following: specific data requests, requests for the execution of functions or of services, requests for calculation, response in the form of returns of results of calculations, return messages, request for exchange of files, etc.

The supplementary module 20 shown in FIG. 1 may further comprise a specific exchange interface 60 provided between the two partitions I, II. Communication between the principal and auxiliary partitions I, II via this specific exchange interface 60 may be carried out via the RAM ports or the file exchange. For this purpose, the specific exchange interface 60 may be allocated at least one port, for example a RAM port, for each of the principal and auxiliary partitions I, II respectively of the supplementary module 20 through which the messages (e.g., between any principal application 21a . . . 2ma and any auxiliary application 21b . . . 2kb) transmitted via the specific exchange interface 60 may pass. It is seen that the specific exchange interface 60 may be implemented in hardware or in a combination of hardware and software.

The specific exchange interface 60 preferably implements an encoding protocol to encode the messages passing through it for security purposes. This encoding protocol, which manages the communication between the two partitions I, II may be such that the auxiliary partition II of the supplementary module 20 can communicate only with the the principal partition I of the supplementary module 10. That is, the auxiliary applications 21b . . . 2kb may communicate only with the principal applications 21a . . . 21b via the specific exchange interface 60. Moreover, it is preferred that the the auxiliary applications 21b . . . 2kb communicate only by a response to a request sent by a principal application 21a . . . 2ma; i.e., it is preferred that the auxiliary applications 21b . . . 2kb do not to initiate the communication. The request sent to an auxiliary application therefore may comprise input parameters allowing the auxiliary application to carry out the calculation. Such parameters may be provided by other principal applications or by the generic applications of the core module 10.

The generic applications 11 . . . 1n and the principal applications 21a . . . 2ma can exchange messages between each other. The communication between the two pieces of equipment comprising the core module 10 and the supplementary module 20 may be carried out through RAM ports, file exchanges, etc. For this purpose, the flight management system shown in FIG. 1 may include a generic exchange interface 30 provided between the core module 10 and the supplementary module 20. The generic exchange interface 30 may comprise at least one core side port allocated for the core module 10 and and at least one supplementary side port allocated for the supplementary module 20, respectively, through which the data (e.g., in the form of messages) may pass. One or both these ports may be the RAM ports. Advantageously, the generic exchange interface 30 may implement an encoding protocol to encode the data carried by the messages passing through it.

The core module 10 may include a core interface 16 configured to interface with an on-board system 40 to thereby allow the core module 10 to communicate with the on-board system 40 of the aircraft. The on-board system 40 may comprise at least one generic man-machine interface 41 and/or one or more generic on-board devices 42 such as those currently installed in aircraft, like flight instruments, various sensors, etc. Thus, through the core interface 16, any or all core applications 11 . . . 1n may communicate with the generic man-machine interface 41 and/or with any or all on-board devices 42. In an embodiment, the core interface 16 may be provided as a core interfacing application which, when executed, implements a core interfacing functionality that allows the core module 10 to interface with the on-board system 40.

The principal applications 21a . . . 2ma may, via the generic exchange interface 30 and via the core interface 16, communicate with the generic man-machine interface 41.

The supplementary module 20 also may include a principal interface 26 accessible by any or all of the other principal applications 21a . . . 2ma. The principal interface 26 may be configured to interface with a man-machine interface 50 specific to the supplementary module 20. Then through the principal interface 26, any or all principal applications 21a . . . 2ma may communicate with the specific man-machine interface 50.

Alternatively, or in addition thereto, the principal interface 26 may be configured to interface with one or more specific on-board devices 51. Some or all principal applications 21a . . . 2ma may be associated with the specific on-board devices 51 (flight instruments, computers, various sensors such as anemometric or inertial sensors . . . ) dedicated to their specific needs. Then through the principal interface 26, each principal application 21a . . . 2ma may communicate with the specific on-board device 51 associated with that principal application.

Also alternatively or in addition thereto, the principal interface 26 may be configured to interface with the generic exchange interface 30 to thereby allow the supplementary module 20 to communicate with the core module 10. Thus, through the principal interface 26, any or all principal applications 21a . . . 2ma may communicate, via the generic exchange interface 30, with any or all core applications 11 . . . 1n. Through the generic exchange interface 30 and the core interface 16, the principal interface 26 can also allow the principal applications 21a . . . 2ma to communicate with the on-board system 40.

Instead of or in addition thereto, the principal interface 26 may be configured to interface with the on-board system 40. In this way, the principal interface 26 can allow the principal applications 21a . . . 2ma to communicate directly with the on-board system 40 (with the generic man-machine interface 41 and/or the on-board devices 42). In an embodiment, the principal interface 26 may be provided as a principal interfacing application which, when executed, implements a principal interfacing functionality that allows the supplementary module 20 to interface with the specific man-machine interface 50, the specific on-board device(s) 51, the generic exchange interface 30 and/or the on-board system 40 (the generic man-machine interface 41 and/or the on-board device(s) 42.

Each man-machine interface 41 or 50 may comprise any one or more of the following devices: screens, touch screens, etc., keyboards, mousse, trackballs, head up display systems, augmented reality systems, or even devices of the EFB (Electronic Flight Bag: devices providing flight information to the crew) type, portable computers, etc.

Recall that the core interface 16 may be configured to interface with the on-board system 40, i.e., with the generic man-machine interface 41 and/or the on-board devices 42. Also recall that the core interface 16 may be provided a core/generic interfacing application, when executed, implements a core interfacing functionality. For example, an execution of the generic interfacing application 16 may allow an acquisition of aircraft data coming from the various generic on-board devices 42 (flight instruments, various sensors, etc.). This core interface 16 may advantageously a core filter (not shown) configured to detect and exclude any invalid data. For example, a filtering algorithm or application may be provided as a part of the generic interfacing application.

The core interface 16 may also comprise a core consolidator (not shown) configured to mix the valid data together in a consolidated item of data. For example, a consolidating algorithm or application may be provided as a part of the generic interfacing application. In order to access this consolidated item of data, a principal application 21a . . . 2ma may send a request on an access port to the core interface 16 (the request then passing through the generic exchange interface 30). The core interface 16 in return may send a response containing the item of data. This is one (of which there could be several) mechanism of responding to a request addressed to the core interface 16.

Figure 2:
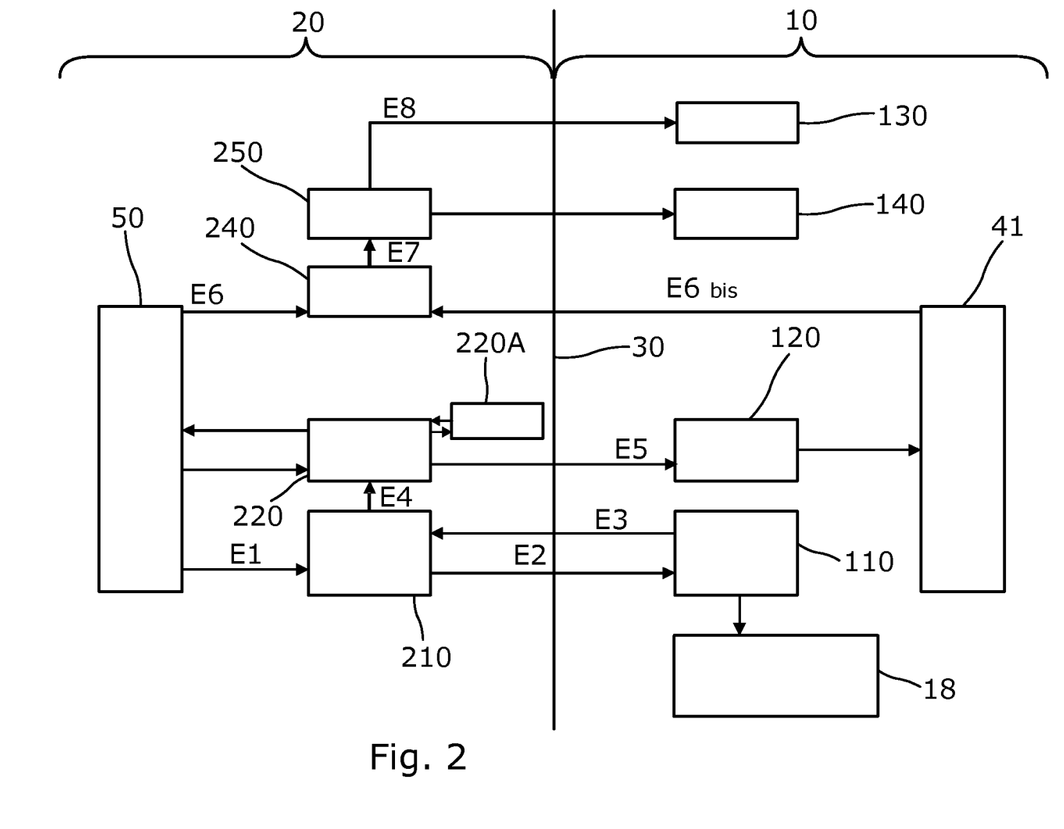
FIG. 2 is a diagram illustrating the use of a flight management system of an aircraft according to an aspect of the present invention.

In the rest of the description there will be given, with reference to FIG. 2, an example implementation of a set of supplementary functionalities of the supplementary module 20 in order to allow a crew of an aircraft to perform the following:

to look for aerodromes (e.g., airports) closest to a current position of the aircraft;
to display them whilst classifying them according to a criteria (the crew may choose the criteria); and then
to propose an alternative flight plan leading to one of the selected aerodromes and able to be activated in place of a current flight plan.

In this example, the core module 10 is assumed to be configured to provide at least the following core functionalities and/or functional services:

an aerodrome identification functionality to identify one or more aerodromes (e.g., airports) closest to the current position of the aircraft (in an embodiment, this information may be determined from information stored in a database 18, called the navigation database);
a display functionality to display this information on the generic man-machine interface 41;
a flight plan transmission functionality to send flight plan availability data; and a flight plan insertion functionality to insert a new flight plan.

For this purpose, the core module 10 may comprise the following generic applications: an aerodrome identification application 110 to implement the aerodrome identification functionality; a display application 120 to implement the display functionality; a flight plan transmission application 130 to implement the flight plan transmission functionality; and a flight plan insertion application 140 to implement the flight plan insertion function.

With regard to the supplementary module 20, its principal interface 26 may be configured to interface with the specific man-machine interface 50 which allows the crew to make requests and to enter parameters. The principal interface 26 may be provided as a principal interfacing application 26, when executed, implements a principal interfacing functionality to interface with the specific man-machine interface 50. For the example implementation, the supplementary module 20 may comprise any one or more of the following principal applications to implement corresponding principal functionalities:

- a search control application 210 to implement a search control functionality to control the search for the closest aerodromes;
- a classification application 220 to implement a classification functionality to classify according to the criteria chosen by the crew via the specific man-machine interface 50 and according to results of prediction calculations, the results being obtained in response to requests sent; a
- a flight plan generation application 240 to implement a flight plan generation functionality to generate an alternative flight plan to the one already established; and
- a flight plan check application 250 to implement a flight plan check functionality to check the availability of a flight plan.

In this implementation example, the classification application 220 is assumed to carry out classifications based on prediction calculations and is assumed to be associated with an auxiliary supplementary application 220A. The supplementary module 20 may provide sequencing of requests to generic applications of the core module 10 (via the ports making it possible to access the functionalities).

As described previously, the generic applications 11 ... 1n of the core module 10 and the principal applications 21a ... 2ma can exchange messages between each other via the generic message interface 30, provided between the core module 10 and the supplementary module 20. An example of the exchange steps implemented are described below.

In a first step E1, using the specific man-machine interface 50, the crew may launch an execution of the principal search control application 210 of the supplementary module 20 and enter the values of the parameters necessary for the implementation of this application (for example: the search radius around the current position of the aircraft, a maximum number of aerodromes, etc.).

In a second step E2, the principal search control application 210 may send a request to the generic aerodrome identification application 110 for identification of the closest aerodromes, so that the aerodrome identification application 110 searches, e.g., in the navigation database 18, for the aerodromes closest to the current position of the aircraft. This request may include the parameters previously selected by the crew. According to one embodiment, this request may be presented in a message containing the parameters. The message may be addressed, in queuing mode (Queuing port), to the RAM (ARINC 653) port of the aerodrome identification application 110 of the core module 10.

In a third step E3, the generic aerodrome identification application 110 of the core module 10 may send a response to the principal search control application 210. According to one embodiment, this response may be addressed, in the queuing mode (Queuing), to the RAM (ARINC 653) port making it possible to access the search control application 210 of the supplementary module 20.

In a fourth step E4, the principal search control application 210 a message to the principal classification application 220 of the supplementary module 20. The classification application 20 may send a calculation request to the auxiliary application 220A so that the latter executes an algorithm for calculating predictions based on extrapolations of values tabulated for each of the aerodromes identified in the response from the core module 10 (e.g., from the generic aerodrome identification application 110). Thus, the auxiliary application 220A may also be referred to as an auxiliary prediction calculation application 220A that implements an auxiliary prediction calculation functionality. The principal classification application 220 may receive through a return message the results from the auxiliary prediction calculation application 220A. The principal classification application 220 may then carry out a classification of the aerodromes based on the predictions, according to criteria which can be defined by the crew on the specific man-machine interface 50. The principal classification application 220 may display the result on the specific man-machine interface 50.

In a fifth step E5, the principal classification application 220 may send a request to the generic display application 120 to display the aerodromes in a particular color on the generic man-machine interface 41, for example, on the navigation screen (Navigation Display). As previously indicated, this request from the principal classification application 220 to the generic display application 120 may be addressed, in queuing mode (Queuing), to the RAM (ARINC 653) port making it possible to access the generic display functionality of the core module 10.

In a sixth step E6, using the specific man-machine interface 50, the crew (e.g., the pilot) of the aircraft may select an aerodrome from among the aerodromes displayed on the navigation screen 41. Alternatively to step E6, and in a step E6bis, the pilot of the aircraft may select an aerodrome from among the aerodromes displayed on the navigation screen using the generic man-machine interface 41 instead of the specific man-machine interface.

Then, in a seventh step E7, the principal flight plan generation application 240 of the supplementary module 20 may calculate or generate an alternative flight plan leading directly to the aerodrome that has been selected.

In an eighth step E8, the principal flight plan check application 250 may read the data concerning the existence and the availability of a secondary flight plan (and therefore not occupied) that the generic flight plan transmission application 130 of the core module 10 sends periodically via messages on a port, in sampling mode (Sampling port). If, on reading this data, it happens that no secondary flight plan is available, the principal flight plan check application 250 may command, via the generic exchange interface 30 and the generic display application 120, the display on the generic man-machine interface 41 a message to warn the crew. If, on the other hand, it happens that a secondary flight plan is available (as is the case in FIG. 2), then the principal flight plan check application 250 may send to the generic flight plan insertion application 140 of the core module 10 a request for insertion of the alternative flight plan in the secondary flight plan. This request can for example be conveyed by a message on a RAM (ARINC 653) port in "queuing" mode (Queuing).

At this time, the core module 10 has access to the secondary flight plan upon which it may calculate predictions and which can be consulted by the crew via its generic man-machine interface 41 and which can possibly be activated for guidance.

One (of which there can be several) advantage of one or more aspects of the present invention is industrial flexibility (e.g., scalability, certification demonstration) can be provided to the supplementary module. The architecture of the supplementary module using at least two entities/partitions I, II makes it possible to update independently, and at different software levels, the two entities of the supplementary module 20. Thus, supplementary functionalities of the supplementary module can be modified solely via the modification of the algorithms of the auxiliary applications. The code of the principal application which governs the behavior of the supplementary application with regard to other principal applications or generic applications need not be modified, and therefore does not need to be checked.

Functionalities specific to an entity, such as an aircraft, a family of aircraft, a company, an alliance, all or part of a fleet of aircraft, can thus be updated in the flight management system without necessitating long and costly verifications of the principal or generic applications.

Aspect(s) of the invention has been described in the case where the two partitions I, II of the supplementary module 20 are partitions hosted on the same IMA equipment, which provides the advantages in terms of segregation and independence of the entities. As a variant, the two entities I, II may be components of a same partition hosted by a single IMA equipment, and the two components may communicate with each other by memory sharing via the specific exchange interface 60. This variant has advantages in terms of computing speed, since the implementation of this variant does not increase the number of partitions of the supplementary module 20.

In another variant embodiment, the two entities I, II of the supplementary module may be hosted in two separate IMA equipments, each of the entities being in an equipment different from the other one. In this case, the communication between these two IMA equipments may be carried out through any one or more of an AFDX (Avionics Full Duplex Switched Ethernet), network, by an Ethernet network, or even by an ARINC429 (Digital Information Transfer System) network via the specific exchange interface 60.

Each of the core 10 or supplementary 20 modules can also implement applications other than those that have been described previously.

Thus, the core module 10 and/or the supplementary module 20 can also comprise a ground data acquisition application (not shown) to implement a ground data acquisition functionality for acquisition of data transmitted from the ground for the aircraft. Such transmissions can be via an ATN (Aeronautical Telecommunications Network) network, an ACARS (Aircraft Communication Addressing and Reporting System) network, a specific VHF (Very High Frequency) network or a fast point to point wireless connection. These data can also be accessed by a mechanism of response to a request addressed to the functionality in question.

The core module 10 can also comprise at least one on-board database 18 in which are stored, for example, data created by the crew, or data provided and loaded on the ground (like runways, navigation points, etc.). It also comprises generic applications for managing these databases. Hear again, these data can be accessed in read/write by a mechanism of response to a request addressed to the generic management application in question.

The databases 18 of the core module 10 may be accessible only by the core module 10 itself. The databases 18 may also be accessed by the principal applications of the supplementary module 20, indirectly via the generic exchange interface 30 and the core module 10. In this latter case, requests and responses may be transmitted via the generic exchange interface 30 which, as mentioned above, can comprise an encryptor, which ensures the security of these requests and responses.

The supplementary module 20 can also comprise one or more specific databases (which is not shown in FIG. 1). That is, the supplementary module 20 may include one or more supplementary databases which can be accessed by the principal partition I of the supplementary module 20, and/or accessed by the auxiliary partition II via the specific exchange interface 60 and/or access by the core module 10 via the generic exchange interface 30.

The core module 10 can also comprise a generic maintenance application 19 which, when it is executed, implements a generic maintenance functionality. This generic maintenance functionality can enable, when a failure has been detection on an equipment, the core module 10 to send messages informing the aircraft's maintenance center of the failure. The core maintenance functionality can also enable the core module 10 to respond to requests from the maintenance center to carry out interactive tests, etc.

The supplementary module 20 can also comprise a principal application implementing such a functionality. That is, the supplementary module 20 may include supplementary maintenance application to implement a supplementary maintenance functionality that can warn when a failure has been detected on any one or more of the core, principal I and auxiliary II partitions.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, the terms "a" or "one" do not exclude a plural number and the term "or" means either or both. Furthermore, characteristics or steps which have been described with reference to one of the above exemplary embodiments may also be used in combination with other characteristics or steps of other exemplary embodiments described above.

The invention claimed is:

1. A flight management system of an aircraft, comprising:
   a core module comprising a plurality of generic applications, the plurality of generic applications being configured such that an execution of each generic application implements a generic functionality related to a management of a flight of the aircraft;
   a supplementary module separate from the core module and comprising a plurality of principal applications, the plurality of principal applications being configured such that an execution of each principal application implements a supplementary functionality specific to an entity to which the aircraft belongs; and
   a generic exchange interface between the core module and the supplementary module, the generic exchange interface being configured to enable messages to be exchanged between the core module and the supplementary module, wherein the supplementary module comprises a principal partition and an auxiliary partition, wherein the principal partition comprises the plurality of principal applications implemented therein, wherein the auxiliary partition comprises at least one auxiliary application implemented therein, each auxiliary application being associated with at least one principal application of the principal partition, the association being such that the execution of the principal application requires an execution of the auxiliary application associated with that principal application, and wherein the supplementary module further comprises a specific exchange interface between the principal and the auxiliary entities, the specific exchange interface being configured to enable messages to be exchanged between the principal and the auxiliary partitions of the supplementary module.

2. The flight management system of claim 1, wherein each auxiliary supplementary application executes only on reception of input parameters provided by at least one principal supplementary application or at least one generic application of the core module.

3. The flight management system of claim 2, wherein each auxiliary supplementary application comprises one or more computing algorithms.

4. The flight management system of claim 1, wherein each auxiliary supplementary application executes only at a request of at least one principal supplementary application.

5. The flight management system of claim 1, wherein the principal and auxiliary partitions belong to a same Integrated Modular Avionics (IMA) equipment.

6. The flight management system of claim 1, wherein the principal and/or the auxiliary partition comprises software.

7. The flight management system of claim 6, wherein the specific exchange interface implements a protocol of encoding data passing therethrough in such a way that the auxiliary partition communicates exclusively with the principal partition and solely by a return message in response to a request sent by a principal application to an auxiliary application.

8. The flight management system of claim 1, wherein the principal and/or the auxiliary partition comprise software components.

9. The flight management system of claim 1, wherein the core module comprises a core interface configured to interface with an on-board system of the aircraft, the on-board system comprising at least one generic man-machine interface, and wherein the supplementary module comprises a principal supplementary interface configured to interface with at least one specific man-machine interface connected to the supplementary module.

10. The flight management system of claim 9, wherein the principal supplementary interface enables the supplementary module to access the on-board system of the aircraft via the core module.

* * * * *